Patented Aug. 14, 1934

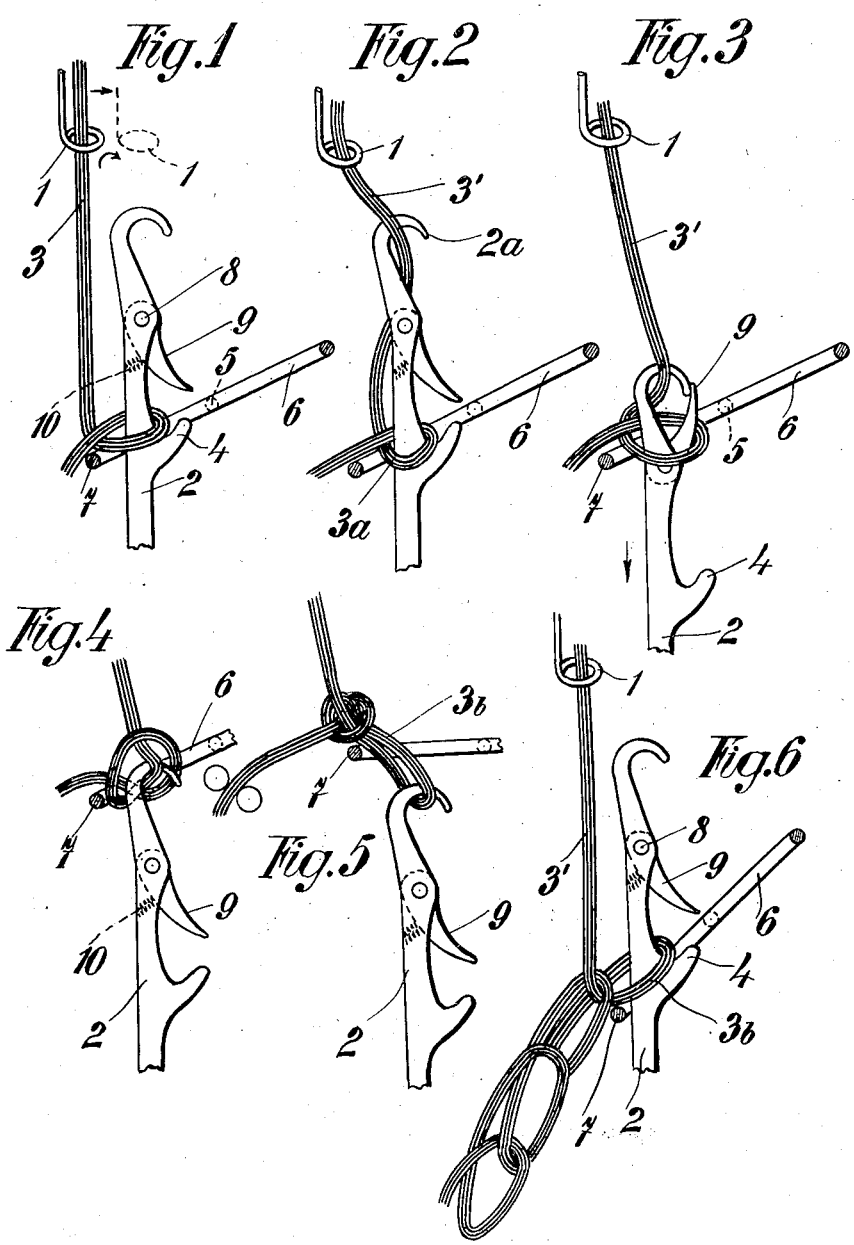

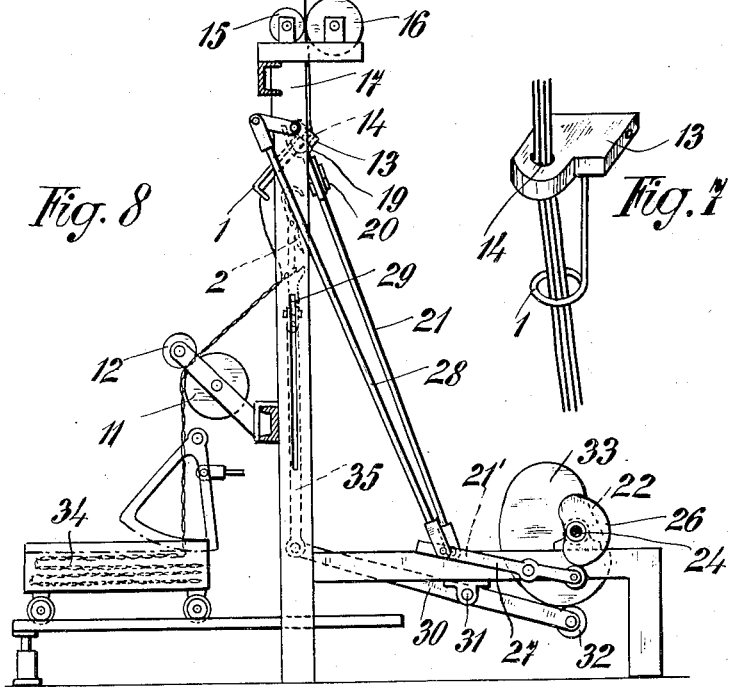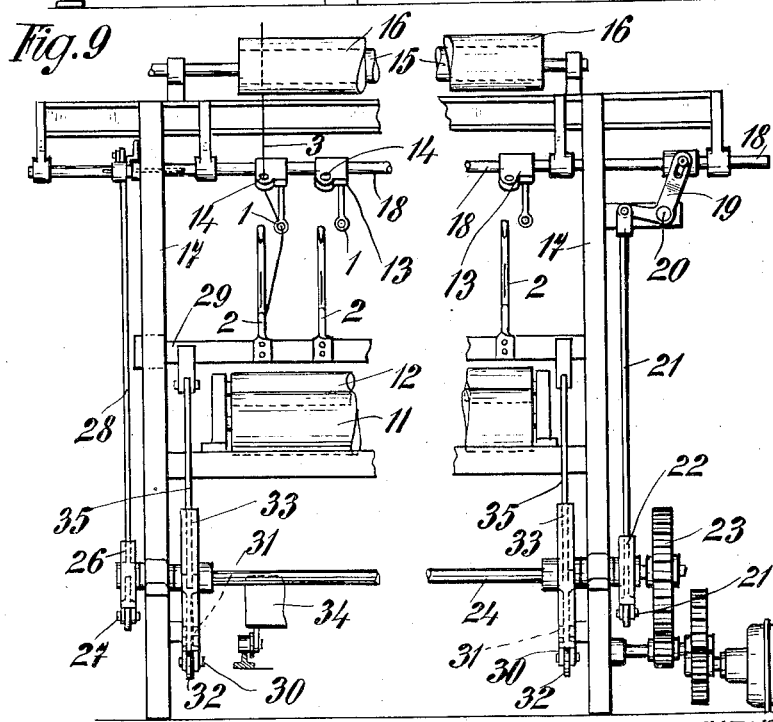

1,970,187

UNITED STATES PATENT OFFICE 1,970,187

METHOD OF CHAIN-LOOPING SKEINS OF RUBBER THREAD AND WARPS OF RUBBER THREAD

Alfred Popper, Odrau, Czechoslovakia, assignor to the firm "Optimit" Gumové a Textilní Závody Akciová Společnost, Odrau, Czechoslovakia Application December 24, 1932, Serial No. 648,794
In Germany March 12, 1932

2 Claims. (Cl. 28—25)

"Chain-looping" of rubber thread, and more particularly of skeins of rubber thread, rubber thread chains, of any number of strands is the recognized workshop term in rubber thread manufacturing for the working stage which, after completion of the manufacturing process proper, serves to put the rubber thread or whole skeins of rubber thread into a condition fit for transport and storage. This "chain-looping" consists in forming a plurality of parallel and contiguous rubber threads for their entire length into loops or meshes. These meshes must be so consecutively formed that the entire skein is capable at any time of being freed of all the meshes without the formation of knots by the mere drawing apart of the two ends of the skein. This chain-looping has hitherto been carried out in all rubber thread factories by hand, and where production is on a large scale it has always been necessary to employ a large number of workers on this time-consuming operation. For this so-called "chain-looping" it has not hitherto proved possible to find an equivalent, since the nature of the rubber thread material precludes any other method of packing, unless large and clumsy reels were to be employed, since the material would otherwise become crushed, damaged, torn, or entangled.

The invention provides a method and an appropriate device which render it for the first time possible to effect the chain-looping mechanically, thereby not only saving expense but also speeding-up the entire manufacturing process, and more particularly the dispatching of the thread to the machines in which it is worked up, to knitting mills, weaving mills, and the like. The method according to the invention consists in that the skein of rubber thread is controlled by a guiding and a grasping member and guided in such a manner that the series of chain stitches can be mechanically formed. The movements which these two members are caused to carry out are an imitation of those required for chain-looping by hand, and are also similar to the movements performed in ordinary crochet work.

Since the principle of the invention lies in the fact that the comparatively thick skeins of rubber thread are meshed or looped by means of mechanical elements which are adapted to imitate the movements of the hand in the production of stitches, it will be clear that the invention covers the production of stitches of all forms capable of being caused to disappear by the drawing apart of the skein, since the preparation of rubber thread skeins for the purpose of packing and consignment as mentioned above has not as yet even been carried out of mechanical means. The example described below thus shows merely one form of the invention, and an expert in the art concerned would have no difficulty in adapting the movement of the two members which carry out the chain-looping, by means of suitable gearing and transmission, so that any other type of looped stitch could be produced.

This practical example of the method is represented in perspective views of six different phases in Figures 1 to 6. Fig. 7 shows the guiding member in perspective, while in Figures 8 and 9 the diagrammatic lay-out of a complete mechanical device is shown, and that in Fig. 8 in side elevation, and in Fig. 9 in front elevation.

The two above-mentioned members which replace hand work consist, as the figures show, of an eyelet or the like 1, which is referred to hereinafter as the guiding member, and of a part 2 which resembles a crochet hook, and which is referred to hereinafter as the grasping member.

As can be seen from Fig. 1, the rubber thread skein 3 is taken from above down through the eyelet, and laid about the part 2 before the starting of the chain-looping operation in the manner shown in Fig. 1. The sliding down of the skein is prevented at this stage by a projection 4 on the part 2. A frame 6 is adapted to be tilted about a pivot 5. The part 2 is disposed within this frame, and the skein 3 bears, in the initial position, against the lateral portion 7 of this frame 6. A tongue 9 is so mounted on a pin 8 on the grasping member that this tongue, in the normal position, projects from the two side walls of the part 2. A weak spring 10 ensures that the tongue 9, when in the normal position, can not pass completely in between the two side walls of the grasping member 2.

The parts 1 and 2 are so arranged in the framework of the machine, or are connected to such driving members that the part 2 can only carry out a vertically reciprocating movement in the direction of its middle axis, while the part 1 can be so guided that it is moved completely about the axis of the part 2. In the initial position, that is to say in the position shown in Fig. 1, this member 1 is situated above and behind the grasping member 2. As the arrows indicate, the member 1 can be moved towards the right and at the same time forwards, that is to say in the direction of emergence from the plane of the drawings. The purpose of this movement becomes clear from a consideration of Fig. 2 from which it can be seen that in this manner the upper portion 3' of the skein has been moved through 360° about the head of the part 2, and remains stationary in its position of rest after this movement. During this phase the part 2 is not necessarily moved. In the succeeding phase, however, as shown in Fig. 3, the grasping member 2 is drawn downwards. The tongue 9 is so lifted by the section 3a of the skein that its tip will come into contact with the tip of the bent portion 2a, and holds the section 3' of the skein enclosed. The purpose of the tongue 9 is thus to enable the turn 3a to be brought up on to the portion 3' of the skein. This phase is illustrated in Fig. 4. The first mesh or loop has now been formed, and the immediate purpose to be fulfilled is to re-establish the original condition, so that the next loop can be formed. This object is accomplished by the following arrangement:—The grasping member 2 is moved still further downwards from the position shown in Fig. 4, and the frame 6 is so tilted that the bar 7 of the frame is moved upwards, so that the movement of the bar 7 and of the grasping member 2 in opposite directions very rapidly effects the drawing down of the length 3b of skein required for the formation of the next loop. The section 3b of the skein is then drawn downwards together with the already formed loop, for example by means of revolving rollers 11, 12, which at the same time also prevent the retraction of the already formed loops. Thereupon the grasping member finally ascends, so that the section 3b of the skein comes up against the projection 4. The part 7 meanwhile returns to its initial position shown in Fig. 1, and the guiding member 1 can recommence its rotary movement about the part 2 in the manner described in connection with Fig. 1. Throughout the entire procedure two supply rolls ensure that a certain length of skein is continuously fed from above through the guiding member 1. The rollers 11 and 12 serve—as indicated—not merely to hold fast but also to convey the finished loops to the laying device.

In Fig. 7 it is shown that the eyelet 1 is preferably attached to a main guiding member 13 which is provided with an aperture. The skein is thus passed first through the aperture 14, and then through the eyelet proper 1. It will be clear that the method can also be carried out by making the guiding member stationary or only vertically reciprocating, and the grasping member movable about the guiding member.

A constructional example of the device serving to carry out the movements required for the method is shown in Figs. 8 and 9. The skein is conducted by the supply rolls 15 and 16 to the aperture 14 and to the eyelet 1. The guiding member 1, 13 is intended, as above described, to carry out a movement about the grasping member 2. For this purpose the part 13 is keyed to a shaft 18 journaled in the framework 17 of the machine. This shaft can be moved to the right and to the left by the rods 21, 21' through the intermediary of the bell-crank lever 19 pivoted on the pin 20. The rod 21' is provided at its end with a roller which is alternately moved up and down by a cam disc 22 driven by countershaft gearing 23. To the driving shaft 24 there is also attached the cam disc 26 which acts upon the end of the lever 27 which serves to operate a rod 28. The shaft 18 is periodically rotated through about 90° by the rod 28. This rotation suffices to move the part 13, which is also reciprocated to the right and to the left, with the eyelet 1 about the grasping member 2.

The grasping member 2 is merely vertically reciprocated, and is therefore mounted on a block 29 which is caused to travel in the grooves of the stand 17 by means of the lever 30 and of the rod 35 which are set in rocking motion with the pin 31 as a pivot by the cam disc 33 and the roller 32. From a common drive the laying device 34 can also be caused to derive a slow lateral reciprocating movement, so that individual sections of the chain-looped skein are laid automatically one upon the other. The elements of the driving mechanism are so dimensioned that the direction of movement and the speed of all the parts of the plant are appropriately adapted to the requirements of the individual phases of the process.

What I claim is:

1. An apparatus for the chain-looping of rubber threads or whole warps or skeins of rubber threads including a grasping member terminally formed with a hook and having a fixed projection below the hook, means for imparting vertically reciprocating movement to the grasping member, an eye for the threads arranged above the grasping member, means for moving the eye in a path concentric to the axis of the grasping member, and a pivoted frame through which the grasping member is movable.

2. An apparatus for the chain-looping of rubber threads or whole warps or skeins of rubber threads including a grasping member terminally formed with a hook and having a fixed projection below the hook, means for imparting vertically reciprocating movement to the grasping member, an eye for the threads arranged above the grasping member, means for moving the eye in a path concentric to the axis of the grasping member, a pivoted frame through which the grasping member is movable, and a latch carried by the grasping member to cooperate with the hook to close the hook against interference with the movement of the grasping member through the loops of the threads in the formation of the chain.

ALFRED POPPER.